United States Patent [19]

Mao et al.

[11] Patent Number: 4,609,557
[45] Date of Patent: Sep. 2, 1986

[54] MANUFACTURE OF BREAD CRUMB-LIKE PRODUCT

[75] Inventors: Wei-Wen Mao, Dover, Del.; Robert E. Altomare, Yonkers, N.Y.; Joseph Giacone, Princeton Junction; Casimiro P. Matias, Elizabeth, both of N.J.

[73] Assignee: General Foods Corporation, White Plains, N.Y.

[21] Appl. No.: 737,307

[22] Filed: May 23, 1985

[51] Int. Cl.$^4$ .............................................. A21D 13/00
[52] U.S. Cl. ..................................... 426/549; 426/19; 426/28
[58] Field of Search ............................ 426/549, 19, 28

[56] References Cited

U.S. PATENT DOCUMENTS 4,218,480  8/1980  Dyson et al. .................. 426/549 X
4,364,961  12/1982  Darley et al. .................. 426/549 X
4,440,793  4/1984  Seki ..................................... 426/549

*Primary Examiner*—Joseph Golian
*Attorney, Agent, or Firm*—Sam D. Walker; Thomas R. Savoie; Daniel J. Donovan

[57] ABSTRACT

Bread crumb-like product particles having properties comparable to those of conventional bread crumbs are produced by continuously mixing the individual components with a leavening agent in a continuous extruder/cooker, extruding the cooked dough, cutting the extruded dough into small lengths, toasting the cut dough and dividing the toasted dough into a first part and a second part, grinding the first part into discrete dough particles, subjecting the second part to a humidifying chamber then grinding same into discrete dough particles, and combining the ground first part and the humidified ground second part and drying the combination to a desired moisture and texture.

27 Claims, No Drawings

MANUFACTURE OF BREAD CRUMB-LIKE PRODUCT

FIELD OF INVENTION

The present invention discloses a process for preparing a bread crumb-like product with texture, color and appearance similar to conventional bread crumbs. More particularly, the present invention is concerned with a process for preparing a bread crumb-like product simulating both the internal and external portion of bread.

BACKGROUND OF THE INVENTION

Bread crumbs have been generally produced by baking bread according to conventional yeast leavening procedures, allowing the bread to stale then comminuting the stale loaf to the desired particle size. The time required for staling is normally about 1 to 3 days, necessitating a large storage space for the loaves while staling occurs, and the rehandling of the same.

The use of gaseous materials such as carbon dioxide for leavening of bread has also been suggested. U.S. Pat. No. 3,041,176 by Baker, discloses the use of continuous mixers in combination with added gaseous materials. The introduction of gas as disclosed by Baker is used to raise the dough in subsequent baking to avoid the use of any yeast or ferment.

Because of the time required and the number of steps needed to make conventional bread crumbs, several attempts were made to streamline the process making it less time consuming and more economical. For instance, U.S. Pat. No. 4,364,961 by Darley et al. Discloses a continuous process for manufacturing a bread crumb-like product wherein the farinaceous product-forming components are mixed in an extruder with carbon dioxide, or other gas or mixture of gases under critical conditions, to form a gas-leavened dough. The extruded dough is then comminuted to form discrete dough particles which are exposed to hot air to dry the surface of the particles and to stabilize the structure, then dried to the desired moisture content. Also U.S. Pat. No. 4,218,480 by Dyson et al. discloses baking and expanding the gas leavened dough to form a baked bread product which has the characteristic of a stale bread. The overall procedure in the above references requires only a short period of time, when compared to conventional baking processes and staling procedure.

U.S. Pat. No. 4,440,793 by Masao Seki discloses a method for producing bread crumbs comprising forming an essentially yeast-free mixture obtained by adding 0.5-6.0% soy bean protein to wheat flour and mixing therein, salt, fats, emulsifier, pH adjuster, coloring matter and flavoring material as secondary material, adding α-converted starch to the mixture, adding water thereto, and thereafter heating and pressing the mixture by an extruder to extrude the mixture into a rope-like configuration. The rope-like material is drawn from the die of the extruder at a speed greater than the extrusion speed in order to produce bubbles in the rope-like materials. The material is then flattened, cut, crushed and dried. The above reference produces a bread crumb-like product within 8 hours when compared to conventional processes which would have taken up to 36 hours.

None of the above cited references disclose a single continuous process to produce bread crumb-like pieces which simulate both the internal and external sections of a bread simultaneously.

It is, therefore, an object of the present invention to significantly reduce the period of time required to efficiently produce bread crumbs.

Another object of the present invention is to produce a bread crumb-like piece simulating the internal portion of bread;

A further object of the present invention is to produce a bread crumb-like piece simulating the external portion of bread.

Still another object of the present invention is to develop a single continuous process for producing bread crumb-like pieces simulating both the internal and external portion of bread simultaneously.

SUMMARY OF THE INVENTION

The present invention is concerned with a process for preparing a bread crumb mix with dual texture and appearance typifying the internal and external portions of a bread from a single process comprising: feeding a farinaceous material including malted barley flour, an edible acid and a gas forming agent into a cooker extruder; adding sufficient water and mixing to form a dough; cooking the dough for a time and at a temperature pressure effective to develop the gulten into a uniform structure and to substantially gelatinize the starch; extruding the cooked dough; tempering the dough to set the final structure and to complete the cook; cutting the extruded dough into small lengths; toasting the cut extruded dough; separating the toasted dough into a first part and a second part; subjecting the first part to a grinding device; grinding the first part into discrete dough particles; subjecting the second part to a humidifying chamber; grinding the humidified second part into discrete dough particles; recombining the first part and the second part; drying the combined discrete dough particles to achieve the desired moisture and texture.

DETAILED DESCRIPTION

The present invention is concerned with a method for producing a bread crumb-like product which has similar texture, shape and taste to conventional fermented bread crumbs, and has uses in a variety of food products such as fish coatings, chicken coatings, onion rings, meat patties, stuffing mixes, and as garnishes. The present invention provides a continuous cooking extrusion process which prepares a fully cooked, extruded, toasted farinaceous product with the texture, aerated structure, appearance and taste similar to conventional fully-baked, flour-based bread crumbs or croutons.

The term "farinaceous material" is meant to include a grain material such as wheat, rice, oat, corn, peanut, etc.; flour; grits; full fat, partially or wholly defatted grains; refined fraction of grain-like gluten and starches; as well as lesser optional fractions of desirable non-grain materials such as whole or ground seeds, like sesame seeds; beans, like whole defatted soy; seeds like sun flower; and/or other fractions such as protein isolate. In the present invention we are concerned with wheat flour, barley flour and flaky crust flour.

The first step of the present invention involves feeding a farinaceous material, including malted barley flour, an edible acid and a gas forming agent into a cooker extruder. The farinaceous material may also contain wheat flour and flaky crust flour. The malted barley flour acts as a texturizer and aids in the development of a stale bread-like flavor. The malted barley flour is present in amounts up to 15% by weight and preferably from 4% to 6% by weight of the farinaceous composition.

An edible acid such as lactic acid is also added to the farinaceous material. The edible acids should be present in amounts sufficient to lower the pH of the farinaceous dough to that of conventional fermented dough. The amount of edible acid should range from about 0% to 4% by weight and preferably between about 0.1% and about 2.0% by weight of the farinaceous composition. Suitable edible acid include, but are not limited to, lactic acid, phosphoric acid, hydrochloric acid, gluconic acid, acetic acid, succinic acid, adipic acid, fumaric acid, malic acid, tartaric acid, citric acid and mixtures thereof.

Gas is incorporated into the farinaceous dough mixture to obtain an aerated cell structure. Without the gas incorporation, an aerated cell structure will not be obtained as the extrusion conditions used in this invention are milder than those employed in conventional cereal extrusion where steam puffing provides an aerated cell structure. Gas is incorporated into the dough by adding a gas forming agent to the dough which will release a gas during extrusion to develop the desired aerated cell structure. Preferred gas forming agents include: sodium bicarbonate, ammonium bicarbonate, solid carbon dioxide as well as carbonates of other metals. These gas forming agents exclude the use of fermentable gas generators, such as yeast. Another embodiment involves injecting a gas, such as carbon dioxide or nitrogen into the dough during the extrusion process. This results in an open spongy cell structure similar to that observed in a fully baked, yeast leavened, flour based product.

A major portion of the farinaceous material utilized in the present invention is wheat flour. The protein of wheat, namely gluten, possesses the peculiar and distinctive property of forming a visco elastic gel when wetted with water and worked for a period of time, thereby making it suitable for the desired product of the present invention. The amount of wheat flour in the farinaceous material ranges from 55% to 90% by weight and preferably from 50% to 80% by weight.

Flaky crust flour, a refined wheat flour, is used primarily in the baking industry for flaky pastry production. Flaky crust flour may also be present in the farinaceous material in amounts up to 40% by weight and preferably from 10% to 30% by weight of the farinaceous dough mixture.

Varying amounts of dough-forming ingredients may also be added to the farinaceous material. Usually these ingredients include sugar in amounts up to about 14% by weight; milk substitute such as whey, soy isolate or soy protein in amounts up to about 5% by weight; salt in amounts up to about 5% by weight; shortening in amounts up to about 5% by weight; and emulsifiers in amounts up to about 6% by weight. The actual amounts of these ingredients will depend upon the desired characteristic of the final product.

Yeast and amylolytic or proteolytic enzymes may also be included to modify the texture and flavor of the product. Yeast is conventionally used for leavening purposes in bread-making. In the present invention yeast may be used in amounts up to about 10% by weight of the farinaceous dough mixture, as a flavor exhancer rather than for leavening purposes which is accomplished in the present invention by the use of gaseous materials, such as carbon dioxide, baking powder, nitrogen or the like and mixtures thereof.

The farinaceous materials are then mixed with the other dry ingredients. Blending in a ribbon blender or other types of dry blending device is suitable for forming a uniform mixture of the dry materials.

A dough is then prepared by mixing the uniform mixture of dry materials with sufficient water suitable to provide an overall moisture content of the intermixed component of about 20% to 40% by weight and kneading same. This mixing and kneading process can be carried out in a first stage or section of the extruder which has temperatures below the cooking or gelatinization range of the ingredients. The mixing may also be carried out in a batch process or continuous dough mixer and then fed into the extruder.

Optionally, other ingredients such as bread crumb-type flavors, seasonings, particulate vegetable matter, meat, spices, fruit and fruit pieces, nuts, coloring agents and the like, may be incorporated into the dough matrix prior to extrusion.

The dough then passes into the cooking section of the extruder where it is extrusion-cooked for a time and at a temperature and pressure effective to develop the gluten into a uniform structure and substantially gelatinize the starch. The kneading action within the extruder transforms the dough mass into a continuous three dimensional network of hydrated protein fibers that enclose the starch granules and occluded gas which ultimately forms the cell walls of the cooked product.

The dough is subjected within the extruder to cooking temperatures within the ranges of 200° F. to 300° F. and preferably from 225° F. to 275° F. These temperatures are critical to develop the gluten into a uniform structure and to substantially gelatinize the starch. At this temperature the dough is also subjected to pressure and medium to low shear mechanical work within the extruder for a period of time effective to set the protein into a uniform matrix and substantially gelatinize the startch. The effective period of time is dependent upon the variables, temperature, pressure, shear etc., but the mean will generally be within the range of 10 and 20 seconds.

During the extrusion cooking, the head pressure of the extruder is generally within the range of 2.5 to 500 psig and preferably from 10 to 200 psig.

The shear conditions within the extruder are controlled to provide low to medium shear. This requires the use of a screw design within the extruder which will provide the desired shear conditions. The work done on the dough within the extruder is about 15 to 50 watt hours per pound feed which is calculated by the amperage and voltage employed with the dough in the extruder less the amperage and voltage with water but without the dough in the extruder.

The dough within the extruder is heated using an external heat source to cause the setting up of the gluten and the gelatinization of the starch. The temperature within the extruder is maintained sufficiently high so that the heat applied when combined with the heat resulting from the low to medium shear extrusion conditions results in the extrudate emerging from the extruder having a temperature in the range of 220° F. to about 290° F. and preferably from 240° F. to 275° F. The dough is extruded under a back pressure within the range of 2.5 psig to about 200 psig.

The extrudate contains trapped gaseous material which causes expansion of the cooked dough on leaving the extruder. Exit from the extruder is accomplished through a die containing an orifice through which the dough passes. The cross section of the orifice can be any geometric shape. The preferred orifice in the present invention is circular or rectangular. More preferably, the dough is extruded through a 7/16-inch circular die.

The extruded dough is then allowed to temper in order to set the final structure and to complete the cook. Tempering causes a redistribution of the moisture within the rope, in that, the moisture moves from the center where the moisture content is very high to the low moisture area at the crust surface. The dough moisture content at extrusion ranges from about 18% to 35% and preferably about 20% to 28%. The moisture loss account for the formation of the crust of the extruded rope. The moisture migrates from the center to the crust of the rope wherein the rate of such migration will depend on the differences in vapor pressure and the diameter of the rope. At high temperature, moisture will move fairly rapidly from the interior to the exterior of the rope. However, as the rope crust begins to cool the rate of migration decreases. The total tempering time can be up to an hour.

The tempered dough is then cut into small lengths, ranging from ½ to about 24 inches. The moisture of the rope at cutting should range from about 17% to about 30% and preferably from about 20% to about 28%. The tempered cut dough then passes into a toaster where it is toasted and dried to a moisture of less than 20% and preferably from 15% to 20%. The temperature of the toaster should generally range from 250° F. to about 1000° F. and preferably from 400° F. to about 500° F. During the toasting process the tempered cut dough begins to develop color, texture and flavor similar to conventional bread crumbs wherein the exterior portion of the cut dough rope is transformed into a dark, textured and flavorful product simulating the external portion of a loaf while the interior portion remains light and airy simulating the internal portion of a bread loaf. The changes involved in this conversion are complex and fundamental. The basic properties of the starch and gluten are drastically altered. At the same time new substances such as carmelized sugars, pyrodextrins, melanoidins and a wide variety of carbonyl flavor substances are formed to endow the toasted crumbs with its desirable organoleptic properties. Also, caramel color may be employed to enhance a darker appearance of the outer portion.

The length of time the dough remains in the toaster is dependent upon the temperature in the toaster, the speed of the belt and the type of oven toasting apparatus. Generally, the toasting time should range from 2 to 15 minutes. The toasted dough is then separated into a first part and a second part and each part subjected to separate and distinct processes. The parts are separated into proportions simulating the internal and external portions of bread. The first part represents the internal portion of the bread consisting of from 65 to 85% of the toasted dough and the second part represents the external portion of the bread representing from 15 to 35% of the toasted dough.

The dough of the first part is then subjected to a grinding device and ground to a distribution of particles ranging from ½ inch to 0.0117 inch. This grinding is accomplished by using an attrition type milling machine with a ½ inch screen.

The cut toasted dough of the second part is subjected to a continuous humidifying chamber. In the humidifying chamber the cut rope is conditioned for sizing. During conditioning, the moisture of the outer protion of the dough is increased by about 5% making the crust more pliable, hence, decreasing the likelihood of shattering upon exposure to the grinding device.

The humidified dough can then be ground/dried without losing the outer dark portion, thereby maintaining the crust appearance. The non-humidified dough on the other hand shatters upon exposure to the grinding device losing its darker outer portion while the inner light portion remains substantially intact simulating the internal portion of a conventional baked loaf.

The amount of heat supplied, the humidity within the chamber and the duration of time are all factors that exert a fundamental influence on the general character of the final product. The residence time within the humidifying chamber is about 2 to 10 minutes and the relative humidity within the chamber generally ranges from 50% to 100% and preferably from 70% to 80%. The temperature maintained within the humidifying chamber ranges from 120° F. to 250° F. and preferably from 150° F. to 220° F. depending on the humidity and the residence time.

The moisture of the humidified dough as it exits the humidifying chamber ranges from 15% to 25% and preferably from 16% to 22%.

The humidified dough of the second part is then subjected to a grinding/dicing device and ground to a distribution of particles ranging from ½ inch to 0.0117 inch.

The ground dough of the first part is then combined with the humidified ground dough of the second part in a ratio in proportion typifying the internal and external portion of a conventional bread loaf. The combined first and second part is then conveyed to a dryer to be dried to the desired moisture and final texture. The temperature within the dryer should range from 200° F. to about 350° F. and preferably from 200° F. to about 250° F. The residence time within the dryer should range from 2 minutes to 10 minutes. The final crumb moisture exiting the dryer is in the range of 2% to 10% and preferably from 4% to 8%.

The dried bread crumb-like product may be coated, dipped or sprayed with other ingredients (e.g. seasoning, fat, flavor, color, etc.).

The following examples illustrate the preferred embodiment of the invention.

EXAMPLE 1

| Ingredients | Percentage |
| --- | --- |
| Enriched Bromated Wheat Flour | 60.01 |
| Flaky Crust Flour | 19.95 |
| Sugar | 4.78 |
| Malted Barley Flour | 4.00 |
| Baking Powder | 2.79 |
| Milk Substitute | 2.39 |
| Dextrose | 1.59 |
| Sweet Whey | 1.59 |
| Salt | 1.19 |
| Shortening | 0.79 |
| Lactic Acid (85%) | 0.59 |
| Mono and Diglycerides | 0.16 |
| Glycerol Monostearate | 0.16 |
| Acetic Acid | 0.01 |

The above ingredients were mixed in a ribbon blender. Then the blend containing an average of 9.2% water was metered to a cooking extruder through a volumetric feeder. Just downstream of the feed opening, 8.75 gal/hr of deionized water was injected. The extruder jacket was cooled with water in the feed zone and set at 240° F. in a first cooking zone and 325° F. in a second cooking zone. A moist expanded rope of 25.7 mm diameter emerges from a 7/16" die at a rate of 5.75 lb/min and a moisture content of 28.0%. The extruder pressure, measured just before the die ranged from 10-20 psig at a product temperature of 258° F. For the supplied rates, a total of 8.75 kw were consumed. Based on the drive input power, the extrudate receives a total energy input of 0.035 kwh/lb of feed blend. However, additional energy was supplied to the dough through the jacket heaters. In this example, 15.1 kw were consumed in heating the jackets.

The extruded dough, which slowly expands as it leaves the extruder, was tempered under ambient conditions on a belt conveyor for about 45 seconds during which time the rope expands to its final size and continues to cook and set its structure. The tempered rope was cut into lengths of approximately 18 inches and loaded into a 2 stage toaster set at 425° F. in both zones. Time in the toaster was 8 minutes. During toasting a brown crust forms on the surface and encapsulates a moist interior. A thermoscouple embedded in the surface of the rope indicates that the crust attained a temperature of 278° F., while the interior of the rope reached a maximum temperature of 231° F. Moisture of the cut ropes dropped from 24.0% to 17.5% in the toaster.

The toasted ropes were divided into two portions. About 70 percent of the ropes were passed through a hammer mill fitted with a plate containing ½" square openings. In passing through the mill the "crust" shatters into small particles and the interior forms irregularly shaped particles typically ranging in size from 14 U.S. Standard Sieve Mesh to 178".

The remaining 30% of the toasted ropes were placed in a humidifying chamber set at 178° F. dry bulb and 173° F. wet bulb temperature for 5 minutes. During the humidifying procedure the moisture of the toasted ropes rises to 19.5%. The now humidified ropes were twice passed through a dicing device, with cutting knives spaced ½ inch apart. At this point the two fractions are dried for 8 minutes at 200° to 220° F. in a convective dryer. The final moisture content is 4.7%.

EXAMPLE 2

|  | Percent |
| --- | --- |
| Component A |  |
| Enriched Bromated Wheat Flour | 60.94 |
| Flaky Crust Flour | 20.31 |
| Sugar | 6.50 |
| Malted Barley Flour | 4.06 |
| Baking Powder | 2.85 |
| Milk Substitute | 2.44 |
| Salt | 1.22 |
| Shortening | 0.81 |
| Lactic Acid (85%) | 0.53 |
| Glycerol Monostearate | 0.17 |
| Mono and Diglyceride | 0.17 |
| Component B |  |
| 1.62 percent each of dextrose and sweet whey solids are added to the Component A formulation. |  |
| Component C |  |
| 0.30 percent of caramel color is added to the Component A formulation. |  |

Formulation A was sent through an extruder in which the jackets were set at 240° F. in a first cooking zone and 325° F. in a second cooking zone. The rate of cooked product exiting the extruder through a single circular 7/16" die was 5.31 lb/min. Water was fed to the extruder, immediately downstream from the feed opening at a rate of 9.2 gal/hr. Pressures at the die ranged from 10-20 psig. Temperature of the dough just prior to the die was 273° F. The rope which emerges from the die measured 24.7 mm in diameter and possessed a density of 31.2–31.6 lb/ft³. An initial residence time of 9.2 seconds was observed. A total of 10.25 KW was consumed by the extruder drive yielding a specific energy of 0.043 kwh/lb of feed blend. The rope was allowed to temper, cool and set its structure for about 3 minutes when it was cut into 12 inch pieces. The pieces were toasted in a two-stage toaster set at 425° F. in both stages for 8 minutes. The toasted pieces were sent through a hammer mill equipped with a ½" screen.

Formulation B was extruded and processed identically to A except that the 9.0 gal/hr of water were injected into the extruder. Rope density as it exits the extruder is 32.0 lbs/ft³. The ropes were toasted as indicated for Formulation A. Then the toasted pieces were loaded into a humidifying chamber set at 180° F. dry bulb and 175° F. wet bulb. The pieces were humidified for 6 minutes. The humidified pieces were passed twice through a dicing device containing knives set ½" apart.

Formulation C was processed identically to formulation B except that 8.0 gal/hr of water were injected into the extruder. This required 11.0 KW of energy to power the extruder drive.

A blend was formulated containing 68.6% of A, 17.1% of B and 14.3% of C. Each blend consisted of 3 size fractions.

|  | Weight in Grams | | |
| --- | --- | --- | --- |
|  | A | B | C |
| Coarse | 16.00 | 4.00 | 3.30 |
| Medium | 69.04 | 17.26 | 14.40 |
| Fine | 21.27 | 5.30 | 4.43 |

The composite blend was dried for 6 minutes at 200° F.

What is claimed is:

1. A process for preparing a bread crumb mix with texture and appearance typifying the internal and external portions of a bread loaf from a single process comprising:
   (a) feeding a farinaceous material comprising wheat flour in amounts ranging from 55% to 90% by weight and containing wheat gluten; flaky crust flour in amounts of 10% to 30% by weight and malted barley flour in amounts 4% to 15% by weight together with 0% to 4% by weight of an edible acid and a gas forming agent other than fermentable gas generators into a cooker extruder, the gas producing in the final product an open spongy texture similar to that observed in a fully baked, yeast leavened, flour based product;
   (b) adding sufficient water to the extruder to increase the moisture of the farinaceous mixture to an amount ranging from about 20% to 40% by weight of the farinaceous mixture and mixing to form a dough;
   (c) cooking the dough within the extruder for a time ranging from about 10 to about 20 seconds and at a temperature ranging from 200° F. to 300° F. and pressure ranging from 2.5 psig to 500 psig to develop the gluten into a uniform structure and substantially gelantinize the starch;

(d) extruding the cooked dough;
(e) tempering the cooked extruded dough to set the final structure and to complete the cook;
(f) cutting the dough into small lengths ranging from 0.5 to 24 inches;
(g) toasting the cut extruded dough at a temperature ranging from 250° F. to about 1000° F.;
(h) separating the toasted, cut, extruded dough into a first part consisting of from 65% to 85% of the extruded dough and a second part consisting of from 15% to 35% of the extruded dough;
(i) subjecting the first part to a grinding device to produce particles having a distribution of sizes ranging from 0.5 inches to about 0.0117 inches;
(j) subjecting the second part to a humidifying chamber having humidity ranging from 50% to 100% and temperature ranging from 120° F. to 250° F. for a time ranging from 2 minutes to 10 minutes;
(k) subjecting the humidified second part to a grinding device to produce particles having a distribution of sizes ranging from 0.5 inches to about 0.0117 inches;
(l) recombining the ground first part and the humidified ground second part;
(m) drying the recombined first part and second part at temperature ranging from 200° F. to 350° F. for from 2 minutes to 10 minutes to produce a final crumb moisture ranging from 2% to 10%.

2. A process according to claim 1 wherein the temperature of the product exiting the extruder ranges from 220° F. to about 290° F.

3. A process according to claim 2 wherein the temperature of the product exiting the extruder ranges from 240° F. to 275° F.

4. A process according to claim 1 wherein the moisture of the product exiting the extruder ranges from 18% to about 35%.

5. A process according to claim 4 wherein the moisture of the product exiting the extruder ranges from 20% to about 25%.

6. A process according to claim 1 wherein the dough is extruded through a 7/16th inch circular die.

7. A process according to claim 1 wherein the work done on the dough within the extruder ranges from 15 to 50 watt hours per pound feed.

8. A process according to claim 1 wherein the dough is toasted at a temperature ranging from about 400° F. to 500° F.

9. A process according to claim 1 wherein the moisture of the dough at cutting ranges from 17% to 30%.

10. A process according to claim 1 wherein the extruded dough of the second part is subjected to a humidifying chamber having a humidity ranging from 70% to 80%.

11. A process according to claim 1 wherein the extruded dough of the second part is subjected to a humidifying chamber having a temperature ranging from 150° F. to 220° F.

12. A process according to claim 1 wherein the moisture of the humidified dough as it exists the chamber ranges from 15% to 25%.

13. A process according to claim 12 wherein the moisture of the humidified dough as it exits the chamber ranges from 16% to 22%.

14. A process according to claim 1 wherein the ground first part and the humidified ground second part are dried to temperatures ranging from 200° F. to 250° F.

15. A process according to claim 1 wherein the final crumb moisture exiting the dryer ranges from 4% to 8%.

16. A process according to claim 1 wherein the wheat flour ranges from 50% to 80% by weight.

17. A process according to claim 1 wherein the flaky crust wheat flour ranges from 10% to 20% by weight.

18. A process according to claim 1 wherein the malted barley flour ranges from 4% to 6% by weight.

19. A process according to claim 1 wherein said farinaceous material further contains sugar in amounts up to 14% by weight, milk substitute in amounts up to 5% by weight; salt in amounts up to 5% by weight; shortening in amounts up to 5% by weight; and emulsifiers in amounts up to 6% by weight of the farinaceous mixture.

20. A process according to claim 1 wherein the temperature within the extruder ranges from 225° F. to about 275° F.

21. A process according to claim 1 wherein the pressure within the extruder ranges from 2.5 to 200 psig.

22. A process according to claim 1 wherein the edible acid is a member selected from a group consisting of lactic acid, phosphoric acid, hydrochloric acid, gluconic acid, acetic acid, succinic acid, adipic acid, fumaric acid, malic acid, tartaric acid, citric acid and mixtures thereof.

23. A process according to claim 22 wherein the edible acid is lactic acid.

24. A process according to claim 1 wherein the edible acid is present in amounts ranging from 0.1% to 2.0% of the farinaceous mixture.

25. A process according to claim 1 wherein the gas forming agent is a member selected from a group consisting of sodium bicarbonate, ammonium bicarbonate, solid carbon dioxide and carbonates of other metals and mixtures thereof.

26. A process according to claim 25 wherein the gas forming agent is sodium bicarbonate.

27. A process according to claim 1 further comprises the addition of yeast in amounts up to about 1% of the farinaceous mixture as a flavor enhancer.

* * * * *